United States Patent
Kumar et al.

(10) Patent No.: US 12,347,306 B2
(45) Date of Patent: Jul. 1, 2025

(54) EMERGENCY INCIDENT DETECTION, RESPONSE, AND MITIGATION USING AUTONOMOUS DRONES

(71) Applicant: Allstate Insurance Company, Northbrook, IL (US)

(72) Inventors: Surender Kumar, Palatine, IL (US); Mark V. Slusar, Chicago, IL (US); Howard Hayes, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/524,513

(22) Filed: Nov. 30, 2023

(65) Prior Publication Data

US 2024/0105034 A1   Mar. 28, 2024

Related U.S. Application Data

(63) Continuation of application No. 17/706,653, filed on Mar. 29, 2022, now Pat. No. 11,875,670, which is a
(Continued)

(51) Int. Cl.
  *G08B 7/06* (2006.01)
  *B64D 47/02* (2006.01)
  (Continued)

(52) U.S. Cl.
  CPC ............. *G08B 7/066* (2013.01); *B64D 47/02* (2013.01); *E05B 65/108* (2013.01); *E05F 15/72* (2015.01);
  (Continued)

(58) Field of Classification Search
  CPC ......... G08B 7/066; G08B 7/062; E05F 15/72; G05D 1/692; G05D 1/104; B64D 47/02; E05G 65/108
  (Continued)

(56) References Cited

U.S. PATENT DOCUMENTS 6,364,026 B1 * 4/2002 Doshay ................ G08B 17/005
                                                  169/56
9,373,014 B1 * 6/2016 Mehranfar ......... G06K 7/10366
(Continued)

FOREIGN PATENT DOCUMENTS

CN    105292451 A    2/2016
CN    105763842 A    7/2016
(Continued)

OTHER PUBLICATIONS

Oct. 3, 2019—(US) Non-Final Office Action—U.S. Appl. No. 15/906,022, 13 Pages.
(Continued)

*Primary Examiner* — Yazan A Soofi

(57) ABSTRACT

A system may be configured to detect an emergency condition at a premises; dispatch one or more autonomous drones to a location associated with the emergency condition; receive from the one or more autonomous drones, sensor data associated with the emergency condition; generate, based on the sensor data, a plan identifying an evacuation route for safely evacuating the premises; and transmit an instruction that causes the one or more autonomous drones to indicate, to one or more persons in a vicinity of the emergency condition, the evacuation route. The system may further detect, based on the sensor data, one or more safe areas in the premises, and the evacuation route may pass through at least one of the one or more safe areas.

20 Claims, 13 Drawing Sheets

Related U.S. Application Data continuation of application No. 16/991,707, filed on Aug. 12, 2020, now Pat. No. 11,288,936, which is a continuation of application No. 15/906,022, filed on Feb. 27, 2018, now Pat. No. 10,777,051.

(51) Int. Cl.
| | | |
|---|---|---|
| *B64U 101/30* | (2023.01) | |
| *E05B 65/10* | (2006.01) | |
| *E05F 15/72* | (2015.01) | |
| *G05D 1/00* | (2024.01) | |
| *G05D 1/692* | (2024.01) | |

(52) U.S. Cl.
CPC ............ *G05D 1/104* (2013.01); *G05D 1/692* (2024.01); *G08B 7/062* (2013.01); *B64U 2101/30* (2023.01); *B64U 2201/10* (2023.01)

(58) Field of Classification Search
USPC .......................................................... 701/15
See application file for complete search history.

(56) References Cited

U.S. PATENT DOCUMENTS

| | | | | |
|---|---|---|---|---|
| 9,849,044 | B1* | 12/2017 | Groden | G08G 5/0056 |
| 2002/0026431 | A1* | 2/2002 | Pedersen | G08B 17/125 |
| | | | | 706/1 |
| 2011/0130636 | A1* | 6/2011 | Daniel | H04Q 9/00 |
| | | | | 709/201 |
| 2016/0001884 | A1* | 1/2016 | Fleck | B64D 1/14 |
| | | | | 701/2 |
| 2016/0381440 | A1* | 12/2016 | Davis | H04Q 9/00 |
| | | | | 340/870.02 |
| 2017/0092109 | A1* | 3/2017 | Trundle | B64D 47/04 |
| 2017/0121022 | A1* | 5/2017 | Zonio | B64U 10/17 |
| 2017/0128759 | A1* | 5/2017 | Zonio | G08B 17/005 |
| 2018/0165504 | A1* | 6/2018 | Kerzner | G08G 5/0013 |

FOREIGN PATENT DOCUMENTS

| | | |
|---|---|---|
| CN | 205801510 U | 12/2016 |
| CN | 206087314 U | 4/2017 |
| RU | 2612754 C1 | 3/2017 |
| WO | WO-2015152492 A1 | 10/2015 |
| WO | WO-2016195320 A1 | 12/2016 |
| WO | WO-2016210110 A1 | 12/2016 |
| WO | WO-2017066765 A1 | 4/2017 |

OTHER PUBLICATIONS

Mar. 6, 2020—(US) Final Office Action—U.S. Appl. No. 15/906,022, 9 Pages.

May 28, 2020 (US) Notice of Allowance and Fees Due—U.S. Appl. No. 15/906,022, 8 Pages.

Akihisa W., et al., "A Surveillance System Using Small Unmanned Aerial Vehicle (UAV) Related Technologies," NEC Technical Journal, vol. 8 (1) Special Issue on Solving Social Issues Through Business Activities, Sep. 2013, 6 pages.

Krull W., et al., "Early Forest Fire Detection and Verification Using Optical Smoke, Gas and Microwave Sensors," 2012 International Symposium on Safety Science and Technology, SciVerse Science Direct, Procedia Engineering, vol. 45, Dec. 2012, pp. 584-594.

* cited by examiner

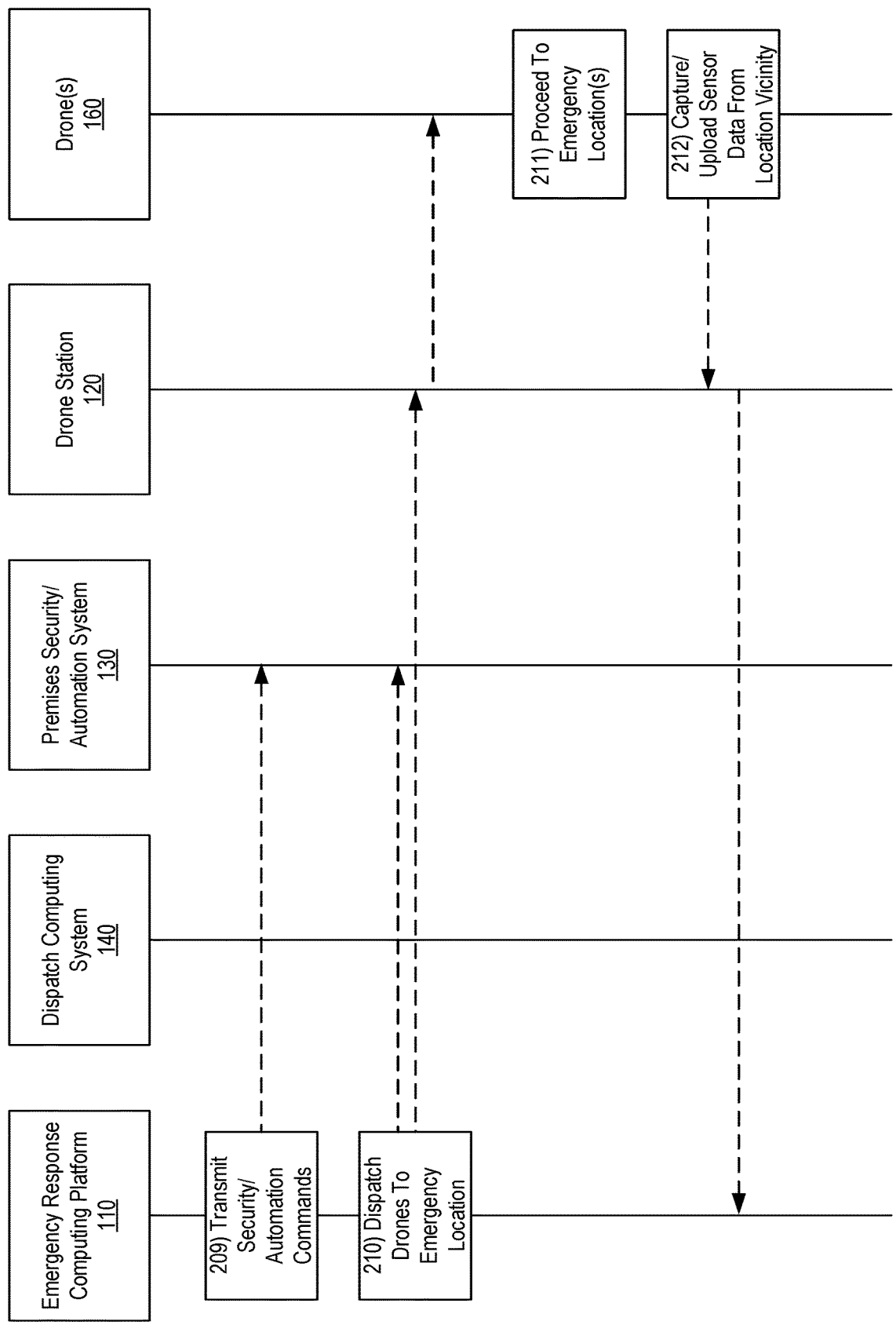

Review Sensor Data
Room: Lobby
Temperature at Location: 105F
Normal Temperature at Location: 70F-75F

| Drone 1 Video | Camera 8 Video |

Microphone 3 Audio:   Play   Pause

Next

Confirm Emergency Condition

Emergency Response Computing Platform Estimate:
    Fire 75%                                          Confirm
    Dangerous Contaminant 50%        Confirm
    Electrical Fault 10%                         Confirm
    Other:                                              Enter Here Emergency Condition Present?     Y    N
Contact First Responder:     Fire   Police   Medical Confirm

Emergency Conditions
    Fire
    Smoke

Recommended Playbooks:
| | |
|---|---|
| Fire Mitigation | Confirm |
| Smoke Mitigation | Confirm |
| Evacuation | Confirm |

Add Playbook

Back      Next

FIG. 5

Response Plan
| | |
|---|---|
| Dispatch Drones to Survey Lobby | Edit |
| Activate Lobby Sprinklers | Edit |
| Activate 1st Floor Ventilation | Edit |
| Play Evacuation Message | Edit |
| Safe Zones: | Edit |
|     Outside Door A | Edit |
| Dispatch Fire Extinguisher Drones to Lobby | Edit |
| Dispatch Drones to Assist in Evacuation | Edit |

Add New Response Task

Back      Confirm

FIG. 6

EMERGENCY INCIDENT DETECTION, RESPONSE, AND MITIGATION USING AUTONOMOUS DRONES

CROSS-REFERENCE TO RELATED APPLICATION

The present application is a continuation of U.S. patent application Ser. No. 17/706,653, filed Mar. 29, 2022 and entitled "Emergency Incident Detection, Response, and Mitigation Using Autonomous Drones", which is a continuation of U.S. patent application Ser. No. 16/991,707, filed Aug. 12, 2020 and entitled "Emergency Incident Detection, Response, and Mitigation Using Autonomous Drones", which is a continuation of U.S. patent application Ser. No. 15/906,022, filed Feb. 27, 2018 and entitled "Emergency Incident Detection, Response, and Mitigation Using Autonomous Drones." Each of these applications is incorporated by reference in its entirety herein.

BACKGROUND

Aspects of the disclosure relate to detecting and responding to emergency conditions that occur in buildings, homes, warehouses, manufacturing plants, retail stores, and other premises. Existing systems for responding to emergency conditions often rely on human detection of an emergency condition and/or human communication of details regarding the emergency condition to first responders (e.g., police or fire departments, medical, or any other emergency response provider). This manual detection and communication process may introduce errors and delay an effective response. Additionally, existing systems for responding to emergency conditions often rely on waiting for emergency responders to arrive, during which time an emergency condition may worsen. Such delays can lead to significant property damage, endanger safety and lives of people, and increase repair and insurance costs.

SUMMARY

Aspects of the disclosure provide effective and efficient technical solutions that help to more accurately detect emergency conditions, relay information about the emergency conditions to reviewers and/or responders for analysis, determine a response plan, and execute the response plan to mitigate the emergency condition both before and after first responders arrive.

In accordance with one or more embodiments, a computing platform may be configured to detect an emergency condition at a premises; dispatch one or more autonomous drones to a location associated with the emergency condition; receive, from the one or more autonomous drones, sensor data associated with the emergency condition; plan, based on the sensor data, an evacuation route for safely evacuating the premises; and transmit an instruction that causes the one or more autonomous drones to indicate, to one or more persons in a vicinity of the emergency condition, the evacuation route.

In some aspects, the computing platform may further be configured to detect, based on the sensor data, one or more safe areas in the premises, wherein the evacuation route passes through at least one of the one or more safe areas. In some cases, the emergency condition is a fire, and the computing platform may detect the one or more safe areas based on one or more of temperature data captured by a temperature sensor onboard one of the one or more autonomous drones, smoke data captured by a smoke detector onboard one of the one or more autonomous drones, and image data captured by a camera onboard one of the one or more autonomous drones. In some cases, the emergency condition comprises a hazardous material, and the computing platform may detect the one or more safe areas based on data captured by a hazardous material sensor onboard one of the one or more autonomous drones.

In some cases, the evacuation route passes through a locked door, and the computing platform may be configured to transmit an instruction to a premises automation system that causes the locked door to unlock.

In some embodiments, the computing platform may be configured to determine a location of one or more first responders; determine a location of a person in need of assistance; plan a route from the one or more first responders to the person in need of assistance; and transmit an instruction that causes the one or more autonomous drones to indicate, to the one or more first responders, the route to the person in need of assistance.

In some embodiments, the computing platform may be configured to detect the emergency condition by receiving second sensor data from one or more sensors at the premises; transmit the second sensor data to a reviewer; and receive an indication of the emergency condition from the reviewer.

In some embodiments, the second sensor data may be captured by one or more of a security system and the one or more autonomous drones. In some embodiments, the computing platform may be configured to determine the location associated with the emergency condition based on the second sensor data and a map of the premises. The computing platform may be configured to, prior to the detecting of the emergency condition, receive, from the one or more autonomous drones, third sensor data; and generate, based on the third sensor data, the map of the premises.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, 2E, and 2F depict an illustrative event sequence for detecting and responding to emergency conditions in accordance with one or more example embodiments;

FIGS. 3, 4, 5, and 6 depict illustrative user interfaces involved in detecting and responding to emergency conditions in accordance with one or more example embodiments;

DETAILED DESCRIPTION

Figure 1A:
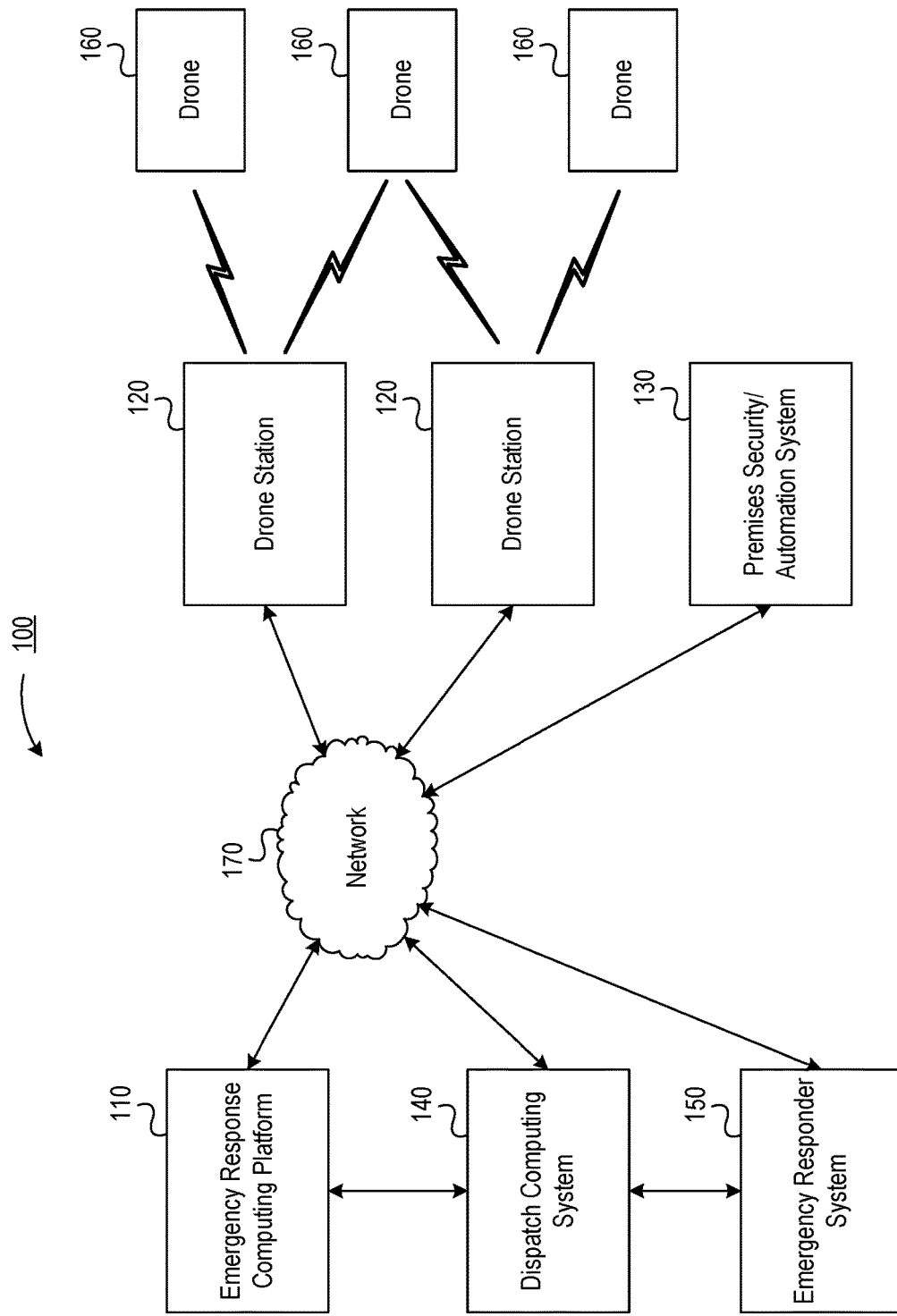
FIGS. 1A, 1B, and 1C depict an illustrative operating environment for detecting and responding to emergency conditions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to detection of an emergency condition. A computing platform may monitor a premises (e.g., a home, a warehouse, a public building, or some other premises) using sensor data captured from various security devices (e.g., security cameras, motion detectors, smoke alarms, window sensors, water leak sensors, and the like) as well as sensor data captured from autonomous drones that may continuously or periodically patrol the premises and/or investigate locations of potential emergency conditions based on sensor data received from other devices. The computing platform may use recognition models to detect emergency conditions from the received sensor data (e.g., based on data values captured by various sensors, such as temperature sensors, smoke sensors, motions sensors, water leak sensor, water flood sensor, intrusion sensors and the like, and/or based on extraction and recognition of information from audio, video, images, or other media using object recognition, machine learning, and other similar techniques). The computing platform may then dispatch drones to a location of the emergency condition to gather additional information about the emergency condition.

Further aspects of the disclosure relate to formulating a response plan for an emergency condition. A computing platform may store "playbook" templates for responding to various conditions and/or performing various actions (e.g., a fire mitigation playbook, an evacuation playbook, a water damage mitigation playbook, etc.) that may be selected based on a detected emergency condition. The computing platform may use the selected templates to generate a response plan containing specific action items based on a location of the emergency condition, a type and severity of the emergency condition, the presence of people nearby the emergency condition, and other variables that may be relevant to the specific emergency condition.

Further aspects of the disclosure relate to techniques for responding to an emergency condition. A computing platform may control and/or otherwise use autonomous drones to respond to an emergency condition by attempting to mitigate the emergency condition (e.g., activating fire extinguishers to mitigate a fire condition, automatically shutting off a main water valve, turning off appliances such as a dishwasher and/or a laundry machine in case of appliance water overflow), by directing people nearby the emergency condition along an evacuation route, by following and/or otherwise staying nearby people that are evacuating, by finding victims that require assistance, and/or by directing first responders to the victims that require assistance. These and more techniques are described in detail below.

Figure 1B:
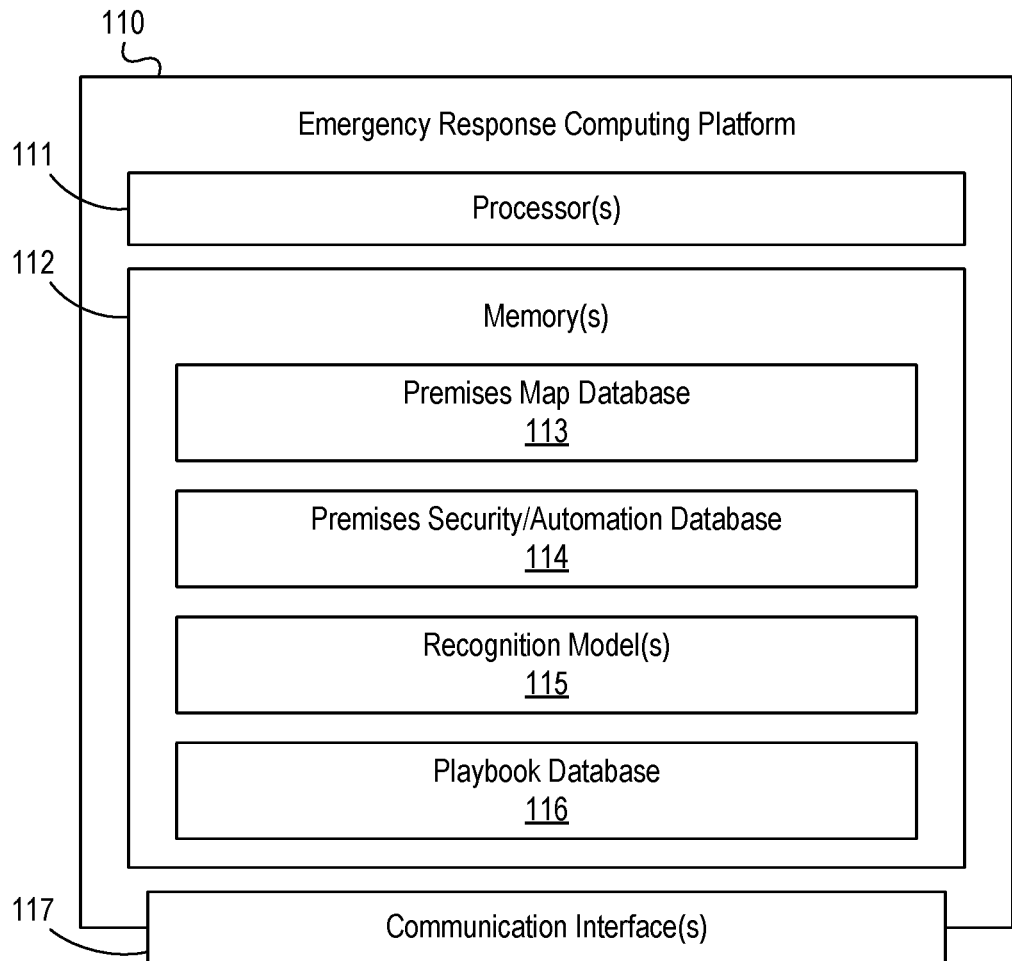
Figure 1C:
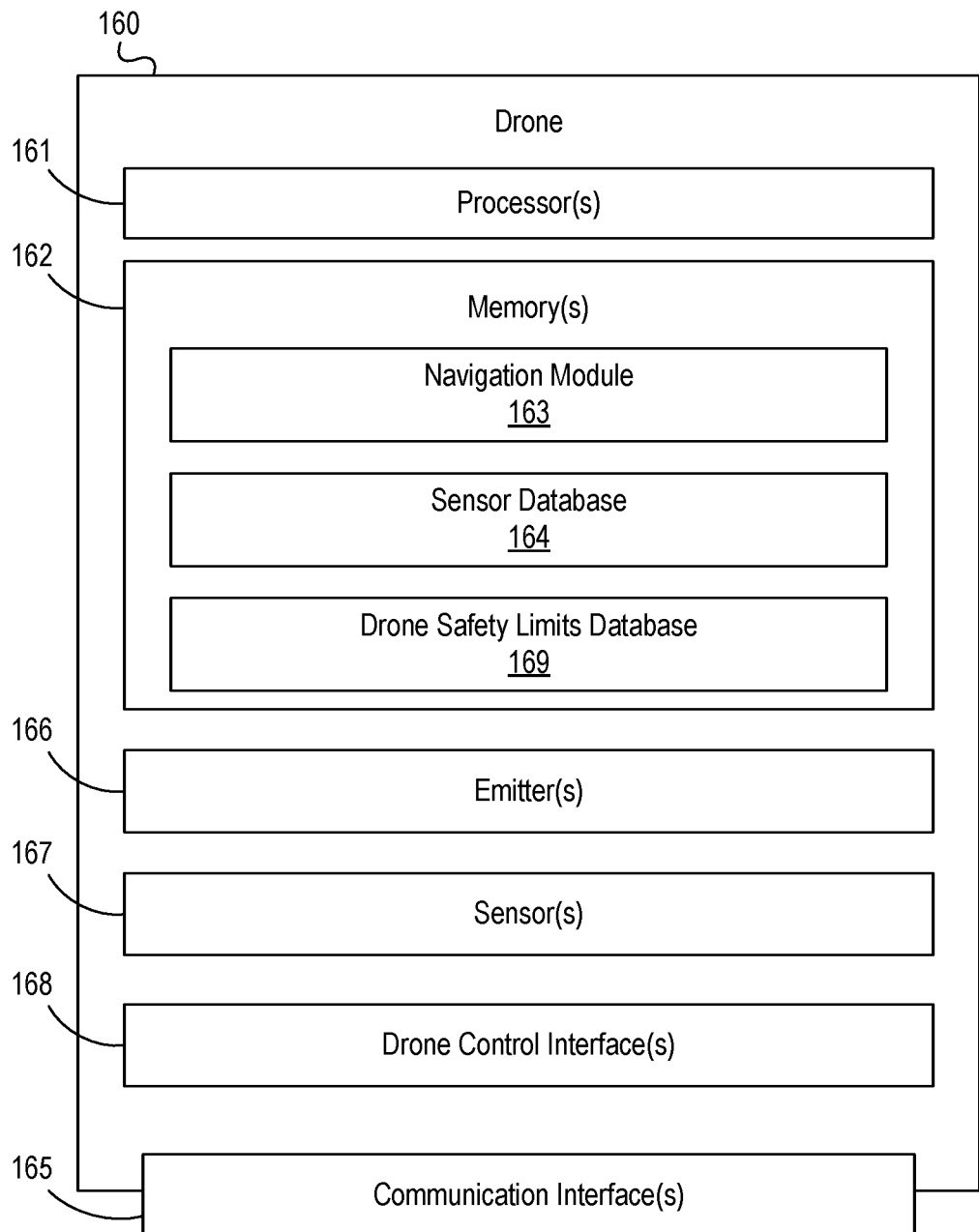

FIGS. 1A, 1B, and 1C depict an illustrative operating environment for detecting and responding to emergency conditions at a premises. Referring to FIG. 1A, operating environment 100 may include an emergency response computing platform 110, one or more drone stations 120, a premises security/automation system 130, a dispatch computing system 140, an emergency responder system 150, and one or more autonomous drones 160. The emergency response computing platform 110, one or more drone stations 120, premises security/automation system 130, dispatch computing system 140, and emergency responder system 150 may be connected by a network 170, which may include a public network (e.g., the Internet) and/or a private network, each of which may include one or more wired networks and/or one or more wireless networks. In addition, the drone stations 120 may communicate with the drones 160 using wireless communications as the drones move about the premises. Each of the emergency response computing platform 110, one or more drone stations 120, premises security/automation system 130, dispatch computing system 140, and emergency responder system 150 may be special purpose computing devices configured to perform specific functions, as described below, and may include specific computing components such as processors, memories, communication interfaces, and/or the like.

For example, the emergency response computing platform 110 may be configured to control or manage aspects of an emergency response service, including detecting an emergency condition, generating a response plan, communicating with the premises security/automation system 130, and controlling the drones 160. The drone stations 120 may be configured to wirelessly communicate with the drones, and may further include docking stations and/or charging facilities to which the drones may return when not in use. The premises security/automation system 130 may be configured to monitor and control security and automation functions of a premises, and may connect to, comprise, and/or control sensors (e.g., video cameras, window sensors, intrusion detection sensors, smoke detectors, water leak sensors, and the like), switches (e.g., for controlling lights, appliances, and other electric devices), and other such automation and/or security devices. Although the premises security/automation system 130 is described herein as a unitary system, in some embodiments a security system and a home automation system may be separated. A dispatch computing system 140 may be configured to provide interfaces for reviewing sensor data received by and determinations made by the emergency response computing platform 110, as well as providing communication functions to communicate with emergency responders. The emergency response computing platform 110 may communicate with the dispatch computing system 140 via the network 170 and/or via other links (e.g., via a telephone link or other link). An emergency responder system 150 may be associated with emergency responders, such as fire, police, and/or medical personnel. The emergency responder system 150 may communicate with the dispatch computing system 140 via the network 170 and/or via other links (e.g., via a telephone link or other link).

The autonomous drones 160 may be configured to perform various functions, including exploring a premises, capturing sensor data in and about the premises, communicating the sensor data to the emergency response computing platform 110 (e.g., via a drone station 120), moving towards a location of an emergency condition and capturing sensor data about the emergency condition, and indicating routes (e.g., evacuation routes) to persons nearby or involved in the emergency condition. The drones may be equipped with various sensors to capture sensor data and various equipment to interact with persons involved in the emergency condition, as further described below.

Referring to FIG. 1B, the emergency response computing platform 110 may include a processor 111, memory 112, and a communication interface 117. Processor 111 may control operations of the emergency response computing platform 110, and memory 112 may store instructions that, when executed by processor 111, cause the emergency response computing platform 110 to perform one or more functions. Communication interface 117 may include one or more wired and/or wireless network interfaces, and communication interface 117 may connect the emergency response computing platform 110 to one or more networks (e.g., network 170) and/or enable the emergency response computing platform 110 to exchange information and/or otherwise communicate with one or more devices connected to such networks. Memory 112 may store and/or otherwise provide a premises map database 113, a premises security/automation database 114, one or more object recognition model(s) 115, and a playbook database 116. The premises map database 113 may store one or more maps associated with one or more premises. The premises/security automation database may store information about security sensors and automated devices located at one or more premises. The object recognition model(s) 115 may be used to recognize particular objects appearing in images or video captured by security devices (e.g., security cameras) or particular objects appearing in images or video captured by the drones 160. The playbook database 116 may contain "playbook" templates indicating what actions should be taken in response to certain emergency conditions. In some embodiments, the emergency response computing platform 110 may be carried onboard an autonomous drone 160 and/or may be integrated with a drone station 120.

Referring to FIG. 1C, a drone 160 may include a processor 161, memory 162, and a communication interface 165. Processor 161 may control operations of the drone 160, and memory 162 may store instructions that, when executed by processor 161, cause the drone 160 to perform one or more functions. Communication interface 165 may include one or more wireless network interfaces, and communication interface 165 may connect the drone 160 to the drone stations 120. Memory 162 may store and/or otherwise provide a navigation module 163, a sensor database 164, and a drone safety limits database 169. The navigation module 163 may allow the drone to carry out navigation commands, avoid obstacles, and the like. The sensor database 164 may store information captured by the sensors 167. The drone safety limits database may contain information about sensor conditions that may damage or destroy the drone 160 (e.g., very high temperatures).

The drone 160 also may include emitters 166, sensors 167, and a drone control interface 168. Emitters 166 may include audio speakers for playing audio messages, and/or may include lasers, projectors, or other light emitters for pointing to and/or designating exits and routes, and the like. Sensors 167 may sense conditions such as temperature, smoke, carbon monoxide, radiation, and the like, and may also include cameras (e.g., image and/or video cameras) and microphones. Such data collected via sensors 167 may include temperature data, indication of the presence of smoke, carbon monoxide, radiation, or other such data, as well as audio, images and videos. Sensors 167 may also include positioning sensors such as GPS sensors as well as radar/sonar/LIDAR and the like. Drone control interfaces 168 may allow interaction with drone mobility hardware such as wheels, treads, legs, rotor(s) (e.g., for a flying drone), and the like.

Figure 2A:
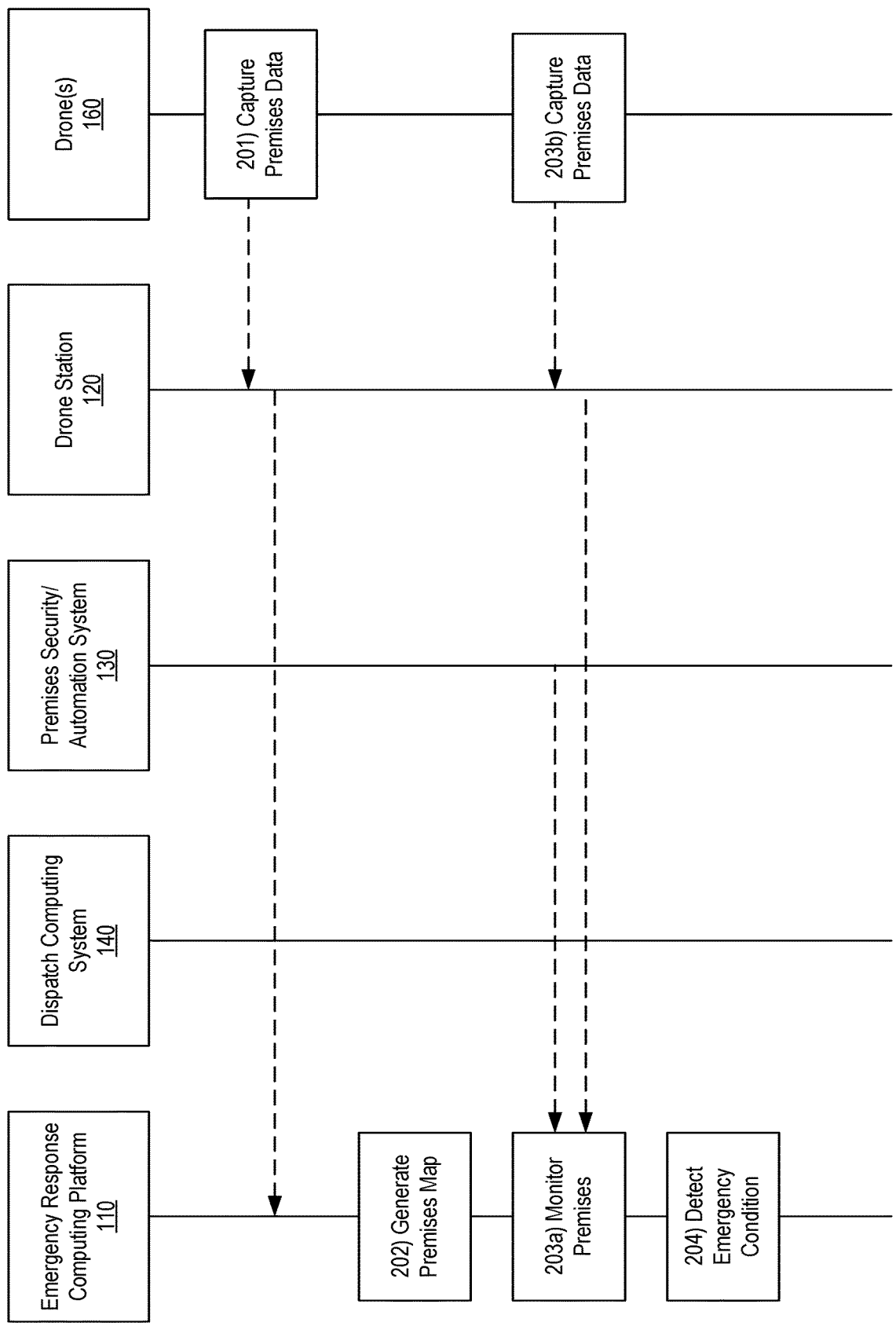

FIGS. 2A, 2B, 2C, 2D, and 2E depict an illustrative event sequence for using autonomous drones to detect and respond to emergency conditions. Referring to FIG. 2A, at step 201, one or more of the drones 160 may initially map a premises by exploring the premises and capturing sensor data while they explore. The drones 160 may execute an exploration algorithm (e.g., using navigation module 163) to survey the premises by starting from a drone station, using sensors to detect the surrounding environment, and attempting to navigate around any obstacles or structures detected. An example algorithm used by navigation module 163 may be a wall-following algorithm. In this way, the drones may proceed through doorways, around furniture or other obstacles, and throughout a premises. The drones may use position data (e.g., based on GPS signals and/or local beacon signals) and/or generate models of the premises in order to ensure that all of the areas of the premises are explored. In some embodiments, the drones may continually communicate positioning sensor data (e.g., image data, LIDAR data, sonar data, and/or the like) to the drone station 120 and/or the emergency response computing platform 110, which in turn may generate the models (e.g., three-dimensional models) of the premises for exploration purposes and communicate the models back to the drones.

The drones may upload some or all of the captured sensor data to the emergency response computing platform 110 in order for the emergency response computing platform 110 to generate a map of the premises. The drones may communicate wirelessly with the drone stations 120, which may in turn communicate with the emergency response computing platform 110 (e.g., via network 170) as illustrated at FIG. 2A. However, other embodiments may use different network topologies to connect the drones 160 to the emergency response computing platform 110.

At step 202, after the captured premises data has been uploaded to the emergency response computing platform 110, the emergency response computing platform 110 may generate a map of the premises. The generated map may include a two-dimensional map and/or a three-dimensional map of the premises generated based on the captured sensor data. The sensor data may indicate (e.g., using LIDAR, radar, sonar, image/video data, positioning data, or the like) where walls, doors, ceilings, floors, furniture, and other obstacles appear in the premises. The emergency response computing platform 110 may use two-dimensional and/or three-dimensional reconstruction techniques to generate models of the premises, which may be converted to and/or used as the maps. Using such techniques, the emergency response computing platform 110 may determine depth data from multiple two-dimensional images (e.g., using triangulation techniques), from three-dimensional images captured by multiple cameras onboard the drones, and/or from captured sensor data such as LIDAR/sonar/radar data, and use such depth data to generate the models.

The emergency response computing platform 110 may further generate maps that contain indications of other sensor readings. Thus the two-dimensional and/or three-dimensional maps may include sensor readings for various locations in the premises. For example, the sensor readings captured by the drones may indicate that a certain room and/or location within a room was measured to have a certain temperature (e.g., 75 F), whereas another room and/or location was measured to have another temperature (e.g., 80 F). Such indications may be stored in the map for multiple sensor data, such as carbon monoxide, radiation, and other such sensor data.

In some cases, the drones may capture and upload multiple sets of sensor data for the premises (e.g., step 201 may be repeated) at various times (e.g., different times of day or days of week) and/or in various conditions (e.g., while a premises is occupied vs. unoccupied). The emergency response computing platform 110 may use the multiple sets of data to average out temporary fluctuations in data in order to generate a more accurate map. In one example, the emergency response computing platform 110 may use such data to remove from the map obstacles that do not appear in every set of data, which may correspond to temporary objects, or even people or animals. Additionally or alternatively, the emergency response computing platform 110 may thus obtain ranges of normal sensor data (e.g., a room or location within a room is normally within a temperature range of 70-75 F) and store such ranges within the map.

The generated map may be tagged with room data for easier review of the map (e.g., during an emergency condition). The emergency response computing platform 110 may detect rooms automatically and assign names to the rooms (e.g., Room 1, Room 2). The automatically assigned names may be based on qualities associated with the room that may be determined by the emergency response computing platform 110 automatically (e.g., Large Room, Small Room on $1^{st}$ Floor, Room with One Door and 2 Windows, etc.). Additionally or alternatively, more descriptive names (e.g., Lobby, Library, etc.) may be assigned (e.g., by a human reviewer).

At step 203a, the emergency response computing platform 110 may continually monitor the premises based on data captured by the premises security/automation system 130 and/or data captured by the drones 160 at step 203b. For example, the drones may periodically and/or continually transmit sensor data from a docked location (e.g., while docked at a drone station 120) and/or while moving about the premises (e.g., on patrol). Additionally or alternatively, devices of the premises security/automation system (e.g., cameras, motion detectors, windows/door sensors, or other sensors) may periodically and/or continually transmit sensor and/or event data to the emergency response computing platform 110. The received data may indicate a location of the drone and/or other device that is transmitting the data. The emergency response computing platform 110 may monitor such received data in order to detect an emergency condition.

In some embodiments, the premises security/automation system 130 may send a periodic all-clear signal (e.g., a heartbeat signal) indicating that it has not detected any abnormal conditions. If the premises security/automation system 130 detects an abnormal condition, it may send event data associated with the abnormal condition to the emergency response computing platform 110. For example, the event may indicate the type of sensor that detected an abnormal condition and any sensor data captured by that sensor and/or other (e.g., nearby) sensors. Additionally or alternatively, the emergency response computing platform 110 may continually send sensor data regardless of whether an abnormal condition has been detected or not. In some cases, the emergency response computing platform 110 may receive high bandwidth data (e.g., high-resolution video data) from the premises security/automation system 130 when an abnormal condition is detected, but may receive lower bandwidth data (e.g., sensor readings, audio data, image data, low-resolution video data, or the like) continuously and/or at regular intervals from the premises security/automation system 130.

At step 204, the emergency response computing platform 110 may detect an emergency condition based on the sensor data and/or event data received at step 203. The emergency response computing platform 110 may analyze the sensor data and/or event data in order to detect the emergency condition.

The emergency response computing platform 110 may analyze video and/or image data using one or more recognition models 115 trained to detect objects or situations associated with an emergency condition. For example, one of the recognition models 115 may be trained to recognize the presence of fire and/or smoke in an image. Therefore, the emergency response computing platform 110 may input video and/or image data received from the premises into the recognition model 115 trained using techniques such as machine learning to recognize a fire-related emergency condition, and if an output of the recognition model 115 indicates a presence of fire and/or smoke, the emergency response computing platform 110 may detect a fire condition. The recognition model 115 and/or other recognition models 115 may be trained to recognize other emergency conditions from images and/or video, such as flood water or weapons. Other models may be trained to recognize other emergency conditions from images and/or video, such as people fighting, water flooding, pipe bursts, hostile animals, people running away, or other such indications of emergency conditions.

The emergency response computing platform 110 may also analyze other sensor data using one or more recognition models 115. For example, the drones 160 and/or premises security/automation system 130 may capture audio at the premises, which may be analyzed for certain noises (e.g., shouting, gunshots, burning, etc.) that indicate an emergency condition. As another example, the emergency response computing platform 110 may capture temperature data, motion detection data, and other such sensor data and analyze it using recognition models 115 trained to detect emergency conditions.

The emergency response computing platform 110 may have previously trained the one or more recognition models 115 using a training data set consisting of various images and/or videos, audio data, and/or other sensor data, some of which are associated with a particular emergency condition and some of which are not. The training data set may further correlate with target variable(s) indicating whether each data item (e.g., image, video, audio, sensor data, etc.) is associated with a particular emergency condition or not. The emergency response computing platform 110 may use one or more statistical and/or machine learning techniques to develop the object recognition models using the training data set. In this way, the object recognition models 115 may be trained to recognize emergency conditions based on various sensor data. In some cases, the model may be trained to detect anomalies related to abnormal behavior and/or sensor readings.

In some cases, the emergency response computing platform 110 may compare received imagery (e.g., still images or video received from the drones 160 and/or the premises security/automation system 130) to previously-recorded images and/or the map generated at step 202. Significant differences between the received images and the previous images or map may indicate that damage to the premises has occurred. The emergency response computing platform 110 may directly compare images (e.g., after performing warping to account for location and/or perspective shifts) and/or generate a map from the received imagery to compare to the map generated at step 202. Thus a second map may be generated according to the techniques described for step 202 and compared to a previously-generated map. Significant differences may indicate an emergency condition comprising damage to the premises.

In some cases, the emergency response computing platform 110 may compare sensor data to one or more sensor levels and/or ranges stored in the map generated at step 202. If certain sensor data exceeds certain levels and/or varies by a certain amount from the sensor data stored in the map, an emergency condition may be detected. For example, if the map indicates that a room or location within a room has a temperature that is typically around 75 F and varies between 65 F and 85 F, then a detection of a temperature of 105 F in the room may tend to indicate an emergency condition. In some cases, such a detection of an anomalous sensor reading may be insufficient to trigger an emergency condition, but multiple such anomalous readings (e.g., high temperature and presence of smoke) may cause the emergency response computing platform 110 to detect an emergency condition.

The emergency response computing platform 110 may additionally or alternatively analyze event data received from the premises security/automation system 130. Such event data may indicate, for example, whether a smoke detector was triggered, whether a locked window was breached, whether a motion detector was tripped, whether an "alarm" button was activated, or the like. Some events may automatically lead to detection of an emergency condition with no further analysis (e.g., activation of an "alarm" button, triggering of a window sensor, etc.). Some events may cause the emergency response computing platform 110 to receive additional data for analysis. For example, a smoke detector being triggered may cause the emergency response computing platform 110 to request (and/or the premises security/automation system 130 to automatically send) high-resolution video data, temperature data, data from nearby smoke alarms, and the like to the emergency response computing platform 110 if the emergency response computing platform 110 was not already receiving such data from the premises security/automation system 130. The emergency response computing platform 110 may then analyze the additional data to detect whether an emergency condition is present or not (e.g., whether there was a false alarm due to cooking or the like). For example, the emergency response computing platform 110 may analyze video data to determine whether smoke or fire appears, or whether any other signs of an emergency condition exist as described above, analyze temperature data to determine if any elevated (e.g., above a normal range) temperatures exist, analyze other smoke detector data to determine if other detectors are sensing smoke, or the like in order to verify the fire condition.

Figure 2B:
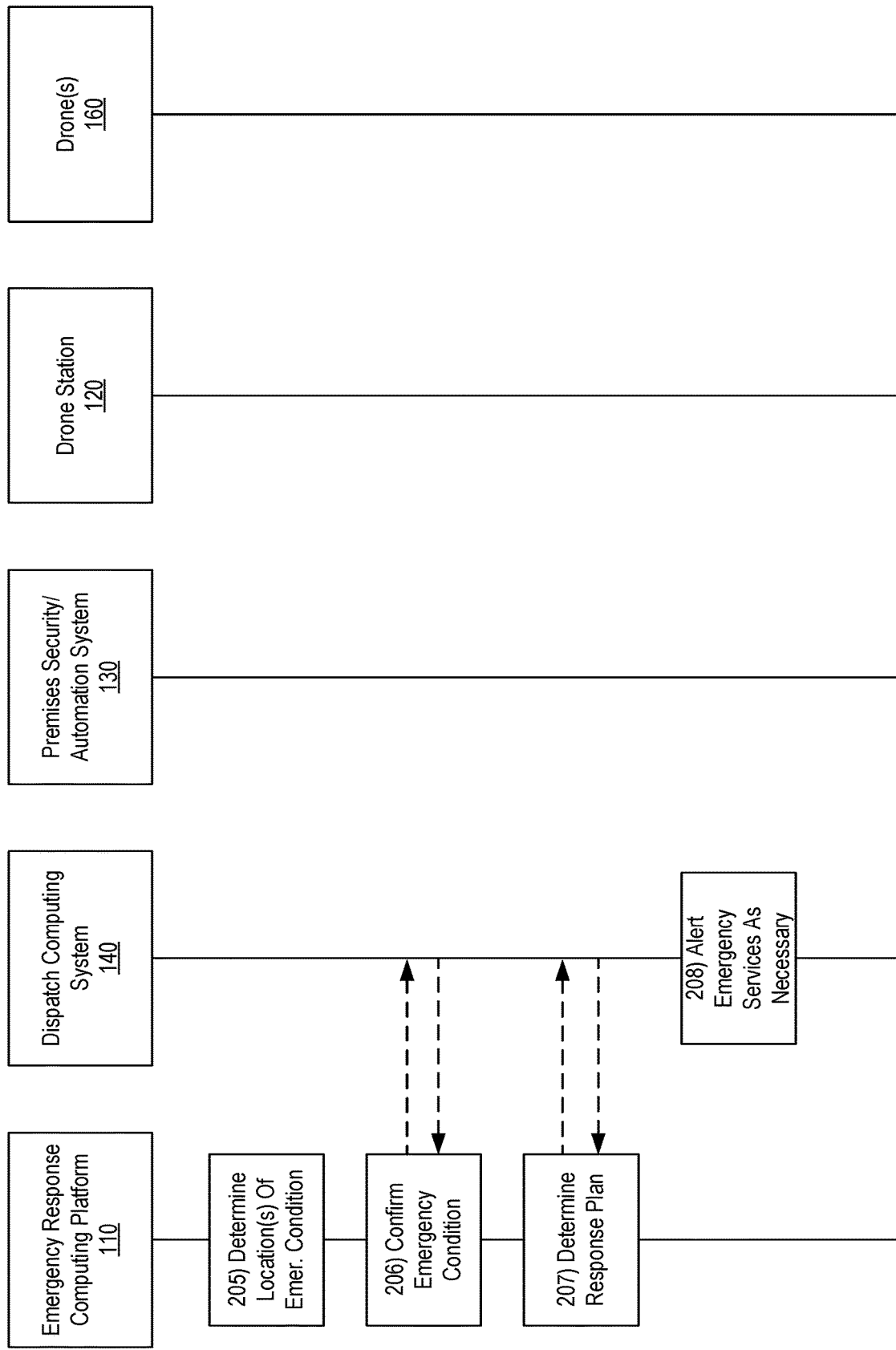

Turning to FIG. 2B, at step 205, the emergency response computing platform 110 may determine one or more locations associated with the emergency condition. The emergency response computing platform 110 may extract location information from the sensor data that was used to detect the emergency condition. Additionally or alternately, the emergency response computing platform 110 may refer to the generated map, which may indicate where devices (e.g., devices of the premises security/automation system 130) are located. Additionally or alternatively, the emergency response computing platform 110 may compare received images and/or video associated with the emergency condition to the generated map (e.g., if the map includes a generated three-dimensional model) in order to determine a location of the images and/or video. The emergency response computing platform 110 may determine one or more locations associated with the emergency condition based on various location(s) extracted from the sensor data and/or determined based on the sensor data.

At step 206, the emergency response computing platform 110 and/or the dispatch computing system 140 may confirm that the emergency condition exists. In some cases, a trained human operator (e.g., a dispatcher) may review the captured sensor data (including audio/video/image data and/or other sensor data) associated with the emergency condition, other sensor data, and/or location data and confirm whether an emergency condition exists. The emergency response computing platform 110 may therefore transmit the sensor data associated with the emergency condition (e.g., the sensor data on which the detection of the emergency condition at step 204 was based) and the location data (e.g., as determined at step 205) to another computing system (e.g., the dispatch computing system 140) for review. The emergency response computing platform 110 may also transmit other sensor data, such as data from sensors located in the same room as the sensors that picked up the emergency condition, sensors within a threshold distance of the location of the emergency condition, and the like for review and confirmation of the emergency condition.

The emergency response computing platform 110 and/or the dispatch computing system may generate, send, and/or otherwise provide one or more user interfaces populated with sensor and location data for review by the operator. FIG. 3 illustrates an example user interface 300 for providing sensor data for review. The user interface 300 may include an indication of a room associated with the emergency location and/or sensor data, as illustrated. The room may be determined by emergency response computing platform 110 by comparing the location data to a map (e.g., the map generated at step 202) to detect a room associated with the emergency condition. In addition to or as an alternative to the display of room name, the user interface may display a map with indicator(s) of the one or more locations of the emergency condition (not illustrated). The user interface may display detected sensor data (e.g., temperature data as illustrated) along with previous sensor readings and/or ranges for comparison. Such a display may allow a reviewer to determine if the sensor data is abnormal for the room. The user interface may display video and/or image data captured nearby the location of the emergency condition (e.g., video from a drone and a camera that are located in the lobby or nearby rooms in the illustrated example). The user interface may further display controls for interacting with video, image, audio, and other sensor data (e.g., play and pause controls for interacting with audio from a microphone, as illustrated).

Additionally or alternatively, the emergency response computing platform 110 and/or dispatch computing system 140 may display information about the determined emergency condition and controls for confirming and/or responding to the emergency condition. The example user interface 400 of FIG. 4 includes several estimates of the determined emergency condition along with confidence levels for each condition. For example, one of the one or more recognition models 115 may have indicated a 75% likelihood of a fire incident based on the sensor data (e.g., based on high temperature data, smoke alarm data, oxygen sensor data, visual recognition of smoke and/or fire from a video or image) input into the corresponding recognition model 115. The same recognition model 115 and/or another recognition model 115 may have output a 50% likelihood of a dangerous contaminant (e.g., based on oxygen sensor data, smoke alarm data, visual recognition of smoke from a video or image, etc.), and similarly the same recognition model 115 and/or another recognition model 115 may have output a 10% likelihood of an electrical fault (e.g., based on other sensor data indicating an appliance lost power). The emergency response computing platform 110 may also allow a reviewer to input a manual determination that another emergency condition is present. The reviewer may select more than one emergency condition (e.g., when multiple conditions are present). The reviewer user interface 400 may additionally or alternatively include a control that may allow the reviewer to confirm that an emergency condition is present (e.g., without specifying which emergency condition is present). The emergency response computing platform 110 may automatically confirm which emergency conditions are present based on the confidence intervals and one or more thresholds (e.g., any emergency condition with a confidence level of at least 40% may be confirmed). The user interface 400 may further include controls for contacting first responders or triggering actions per the playbook.

At step 207, the emergency response computing platform 110 may determine a response plan for responding to the one or more emergency condition(s). The response plan may be tailored to the selected one or more emergency condition(s). For example, if the emergency conditions include fire and smoke, the response plan may be tailored to both the fire condition (e.g., activating sprinklers, evacuation) and smoke condition (e.g., activating exhaust fans). For each detected emergency condition, the emergency response computing platform 110 may activate certain responses, some of which may be dependent on each other.

For many emergency conditions, the response plan may include an evacuation from an area associated with the emergency to a safe area. Thus the response plan may include several sub-steps such as determining which areas are safe and dangerous and providing evacuation directions to help guide people from the dangerous areas into the safe areas, as will be further discussed below. Many emergency conditions may also call for mitigation techniques, which may be specific to the emergency condition (e.g., activating fire extinguishers to combat a fire). The emergency response computing platform 110 may store "playbooks," which may be templates indicating which actions should be taken in response to a given emergency condition.

The response plan may also be tailored to the type of drones 160 that are available and/or the devices that are connected to the premises security/automation system 130. For example, a "dispatch fire extinguisher drones" action item of a "fire mitigation" playbook may be added to a response plan if drones with fire extinguisher equipment are available. As another example, a "play evacuation message" action item of an "evacuation" template may be added to the response plan if a PA system or intercom is available and connected to the premises security/automation system 130.

The emergency response computing platform 110 may coordinate with a reviewer (e.g., at dispatch computing system 140) to confirm and/or modify the response plan. For example, the emergency response computing platform 110 may send the response plan to the reviewer, and receive changes and/or a modified response plan in return. In some cases, the emergency response computing platform 110 may begin executing the response plan before receiving review and feedback on the response plan, as will be described below. The emergency response computing platform 110 may then begin executing the modified/approved response plan after receiving confirmation from the reviewer.

FIG. 5 illustrates an example user interface 500 for allowing a user to select which playbooks to implement to respond to the detected emergency conditions. In the illustrated example, the emergency response computing platform 110 may have determined that the emergency conditions of "fire" and "smoke" are associated with the "fire response" playbook, the "smoke response" playbook, and the "evacuation" playbook. The reviewer may confirm the three playbooks and/or add additional playbooks to the response plan. FIG. 6 illustrates an example user interface 600 for displaying a response plan for modification and/or confirmation.

The response plan may contain default items (e.g., a drone survey) and/or items taken from one or more playbooks (e.g., the playbooks selected and confirmed in user interface 500), and may be tailored to the emergency conditions. As an example of tailoring the action items, an "evacuation" action item may indicate which rooms are scheduled for evacuation (e.g., based on the location information determined at step 205) and safe zones to evacuate to (e.g., based on defaults, based on analysis of the maps generated at step 202, and/or based on sensor readings). As another example, a "mitigation" action item may indicate a location of the mitigation efforts, which devices to activate/deactivate, and/or the like. An "evacuate" and/or "mitigation" action item may also include dispatch of the drones to assist with the action items.

A user (e.g., a reviewer) may access a user interface and edit the response plan as appropriate. For example, the user may modify an order in which the action items will be executed, assign or adjust priorities associated with the items, adjust details of the items (e.g., changing a room or location associated with an action item, adding a room or location to the action item, etc.). The reviewer may also add or delete items. The reviewer may then confirm the response plan via the user interface. The emergency response computing platform 110 may receive the confirmed response plan (e.g., from the dispatch computing system 140) and begin executing the confirmed response plan.

Returning to FIG. 2B, at step 208, the emergency response computing platform 110 and/or the dispatch computing system 140 may establish a communication with the emergency responder system 150 in order to inform the emergency responders (e.g., police, fire, medical, etc.) of the emergency condition and request help. A human operator may communicate with the emergency responders and/or the communication may be automated. In some cases, the emergency response computing platform 110 and/or the dispatch computing system 140 may provide sensor data (e.g., video data, image data, and the like) to the emergency responder system 150 so that the emergency responders may be better informed of the nature and extent of the emergency condition. The emergency response computing platform 110 and/or the dispatch computing system 140 may also inform the emergency responders of the response plan and/or coordinate with the emergency responders to further modify the response plan.

Turning to FIG. 2C, at step 209, the emergency response computing platform 110 may execute the response plan by transmitting one or more commands to the premises security/automation system 130 and/or devices of the security and/or automation systems. For example, the emergency response computing platform 110 may transmit an instruction to activate a sprinkler system in response to a fire emergency condition, may transmit an instruction to turn on and/or flash lights in an area of an evacuation, may transmit commands to turn off appliances near a fire or flood, may transmit commands to unlock and/or open doors and/or windows to allow drones to access the location of the emergency condition and/or to provide a route for an evacuation, may transmit commands to play audio messages over a PA system, and other such commands that may be specified by playbooks or associated with response plan action items.

At step 210, the emergency response computing platform 110 may execute the response plan by dispatching one or more drones to the location of the emergency condition. The emergency response computing platform 110 may determine the location of the drones 160 (e.g., by sending a request to the drones 160, by sending a request to the drone stations 120, which may store location data for the drones 160, or via some other method), then establish routes from the locations of the drones 160 to the location of the emergency condition. The emergency response computing platform 110 may analyze a map (e.g., the map generated at step 202) to determine a route for each drone. The emergency response computing platform 110 may then send commands to the drones 160 (e.g., via the drone stations 120) that cause the drones to execute the movement commands. The emergency response computing platform 110 may also determine whether any doors and/or windows may be opened to allow passage of the drones 160 to the location of the emergency condition (e.g., if the drones do not have the ability to open doors autonomously). The emergency response computing platform 110 may send commands (e.g., to the premises security/automation system 130) that cause doors and/or windows to unlock and/or open.

At step 211, the drones 160 may proceed to the emergency location as instructed. The drones 160 may move (e.g., by walking, driving, flying, etc.) towards the emergency location, passing through doors and/or windows as necessary. If the drones have the ability to open doors autonomously, they may do so (e.g., by sending commands via short-range wireless signals, by physically manipulating door controls, etc.). While the drones 160 are moving towards the emergency location, the drones 160 may continually capture sensor data. During an emergency condition, the drones 160 may compare the captured sensor data to drone safety limits (which may be stored in the drone safety limits database 169). For example, the drone 160 may monitor a temperature as it moves towards the emergency location. If the measured temperature exceeds a threshold (e.g., a temperature that may damage the drone), the drone may interrupt the route and move towards a lower temperature area, and notify the emergency response computing platform 110 of the exceeded safety limit. The emergency response computing platform 110 may then calculate a new route and/or other new instructions for the drone.

At step 212, the drones 160 may capture sensor data in the area of the emergency condition. The drones 160 may autonomously move around the emergency location and/or areas nearby to the emergency location in order to capture sensor data in various locations that may help to determine the extent of the emergency condition, if the emergency condition is changing or ongoing, whether nearby areas are safe, and the like. The drones 160 may continuously and/or periodically upload the captured sensor data to the emergency response computing platform 110 (e.g., via the drone stations 120) for analysis of the sensor data.

Figure 2D:
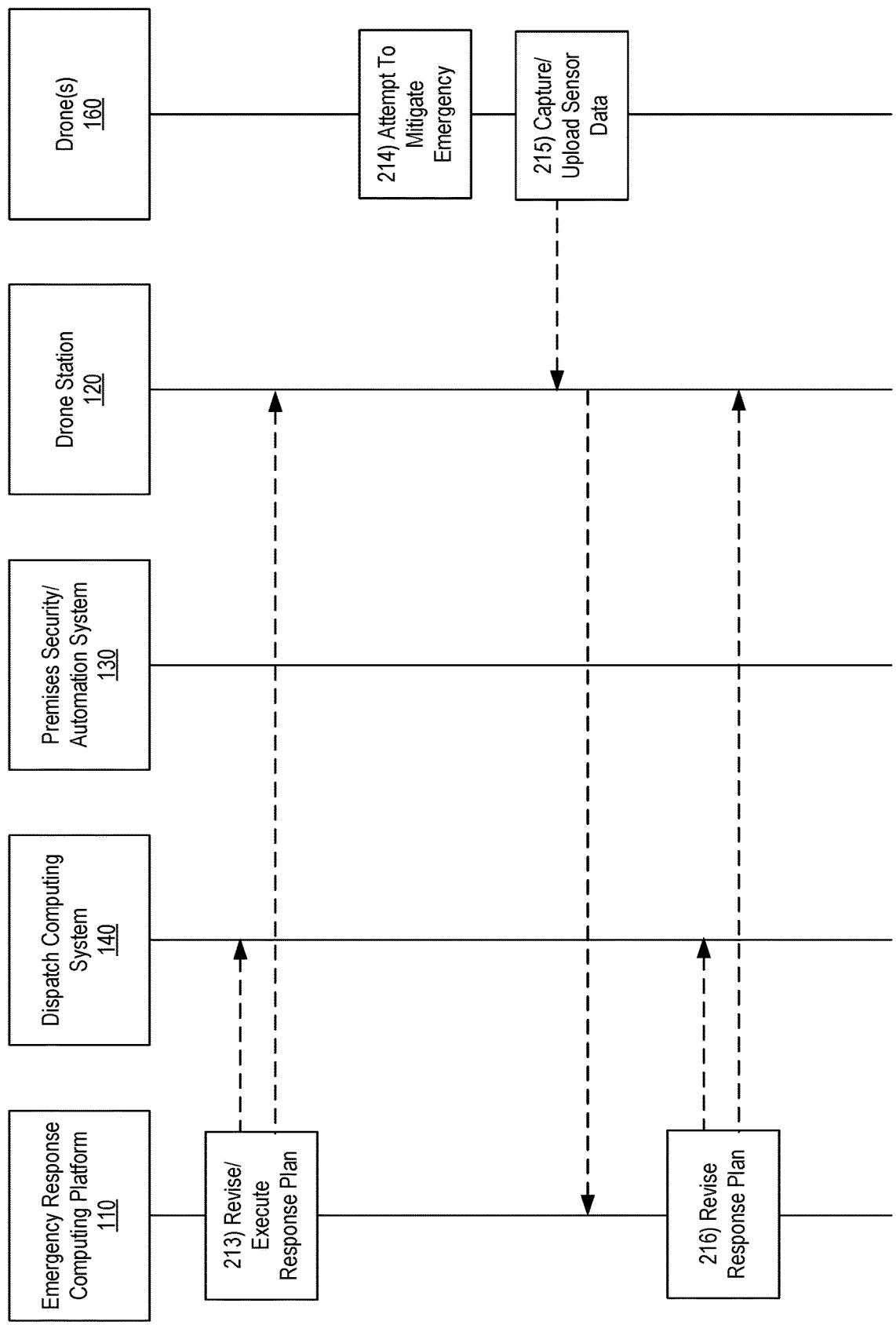

Turning to FIG. 2D, at step 213, the emergency response computing platform 110 may revise the response plan based on all of the captured sensor data (e.g., including the sensor data captured at step 212). With the additional sensor data captured by the drones at the location of the emergency condition, the emergency response computing platform 110 may have more data and/or more accurate data about the emergency condition, the exact location(s) of the emergency condition, the extent of the emergency condition, etc. The emergency response computing platform 110 may further use the sensor data captured in the nearby vicinity of the emergency condition to determine which locations are safe (e.g., which locations near a fire situation do not have a dangerously high temperature or thick smoke). The emergency response computing platform 110, to revise the response plan, may also repeat the detection steps for determining, using the captured sensor data, whether the emergency condition still exists and/or whether new emergency conditions exist (e.g., as described at step 204), the location determination steps (e.g., step 205), the confirmation step (e.g., step 206), the response plan determination step (e.g., step 207), and/or the emergency responder communication step (e.g., step 208). The emergency response computing platform 110 may continue repeating these steps periodically or continuously while new data is collected so that the response plan is continually revised and updated. The emergency response computing platform 110 may continue executing the response plan as it is revised, performing new action items and sending out commands (e.g., to the premises security/automation system 130 and/or the drones 160) as necessary.

At step 214, one or more of the drones 160 may attempt to mitigate the emergency condition (e.g., based on commands received from the emergency response computing platform 110 as part of executing the response plan). For example, some drones 160 may carry a chemical fire suppressant or other fire extinguishing feature onboard. The emergency response computing platform 110 may cause these drones to be deployed to try to suppress or extinguish a fire. As another example, a drone 160 in the vicinity of a violence-related incident may play an audio message indicating that the incident is being recorded and police are on the way, which may deter further violence. As another example, a drone with the capability of opening a door may open a nearby external door to help exhaust harmful substances (e.g., carbon monoxide, smoke, etc.).

At step 215, after the one or more drones 160 attempt to mitigate the emergency condition, the mitigating drone(s) 160 and other drones 160 may continue capturing sensor data and surveying the area of the emergency condition so that the emergency response computing platform 110 may determine any changes (e.g., changes brought about by the mitigation attempt). The drones 160 may thus continue to upload the sensor data to the emergency response computing platform 110 (e.g., via the drone stations 120) as discussed above.

At step 216, the emergency response computing platform 110 may again revise the response plan based on all of the sensor data (e.g., including the sensor data captured after the emergency mitigation attempts). As above, the emergency response computing platform 110, to revise the response plan, may also repeat the detection steps for determining, using the captured sensor data, whether the emergency condition still exists and/or whether new emergency conditions exist (e.g., as described at step 204), the location determination steps (e.g., step 205), the confirmation step (e.g., step 206), the response plan determination step (e.g., step 207), and/or the emergency responder communication step (e.g., step 208). The emergency response computing platform 110 may continue repeating these steps periodically or continuously while new data is collected so that the response plan is continually revised and updated. The emergency response computing platform 110 may continue executing the response plan as it is revised, performing new action items and sending out commands (e.g., to the premises security/automation system 130 and/or the drones 160) as necessary.

Figure 7:
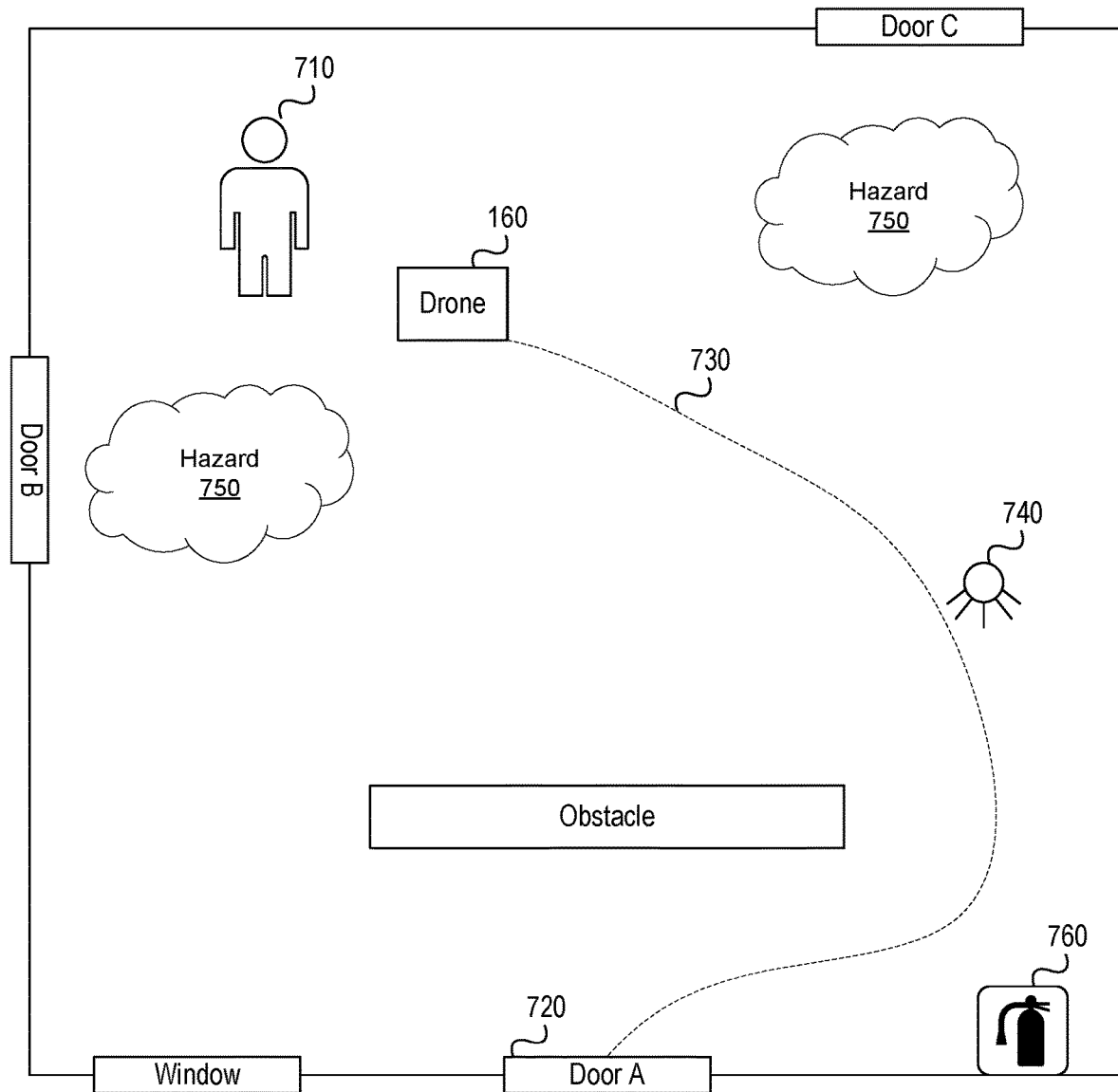
FIG. 7 depicts an illustrative premises map associated with detecting and responding to emergency conditions in accordance with one or more example embodiments.

The response plan, as previously mentioned, may include an evacuation action. The emergency response computing platform 110 may calculate an evacuation route based on the captured sensor data, which may indicate which areas nearby and around the emergency condition are safe. Turning to FIG. 7, a drone 160 (along with other drones 160 that are not illustrated) may survey an area nearby an emergency condition and capture sensor data (e.g., as described at step 212). Using the captured sensor data, the emergency response computing platform 110 may identify safe areas and unsafe areas (e.g., hazards 750), which may be associated with high temperatures, significant smoke, fire, or other dangerous conditions as detected from sensor data. The emergency response computing platform 110 may further identify the presence of one or more persons 710 to be evacuated (e.g., using object recognition techniques as discussed above).

The emergency response computing platform 110 may then determine an evacuation route 730 that takes into account the safe areas and dangerous areas. The emergency response computing platform 110 may generate a different evacuation route for each detected person or group of persons. The emergency response computing platform 110 may also determine the evacuation route based on a map (e.g., the map generated at step 202), which may indicate the location of obstacles, exits, and other aspects of the premises. The map and/or the information stored in premises security/automation database 114 may further indicate where safety equipment is located (e.g., a fire sprinkler 740 and/or a fire extinguisher 760), and the emergency response computing platform 110 may use such indications to determine which areas are safe or not. Therefore, as illustrated, the evacuation route 730 may pass by the fire sprinkler 740 and the fire extinguisher 760.

Figure 2E:
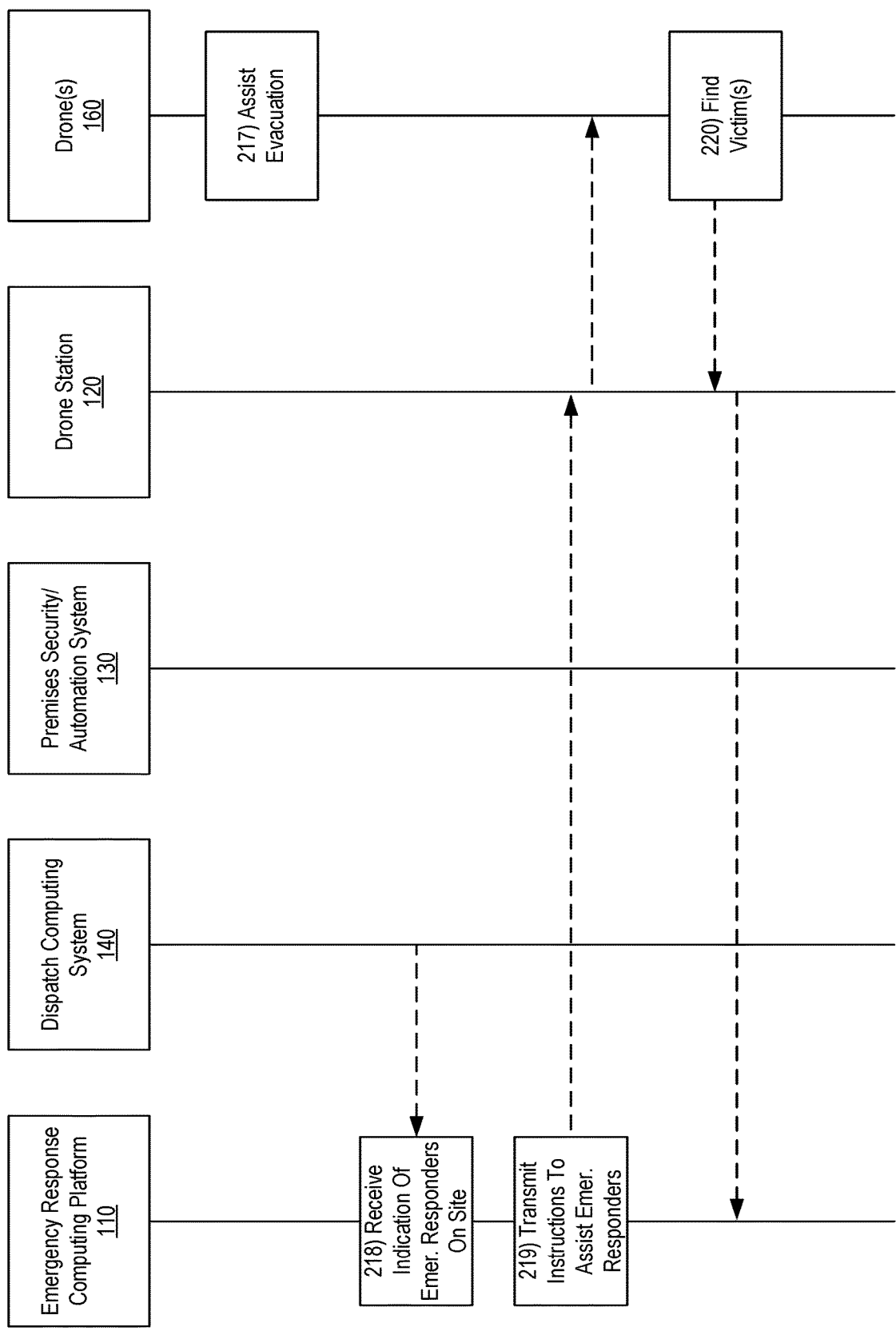

Turning to FIG. 2E, at step 217, the drones 160 may assist with an evacuation. The emergency response computing platform 110 may send commands to the drones (e.g., as part of the response plan) that cause the drones 160 to assist with the evacuation. One or more drones may assist with the evacuation by playing a message (e.g., via a speaker onboard the drone) that instructs anyone in the vicinity to evacuate. The message may further provide instructions for evacuating (e.g., indicate which door to exit by, which way to head, where a safe zone is, and/or the like). The emergency response computing platform 110 and/or the drone 160 may generate such a message and the drone 160 may output the message (e.g., using text to speech or by playing a message read by an operator, such as a dispatcher) after determining an evacuation route 730.

One or more drones 160 may also assist the evacuation by displaying indicators of the evacuation route 730. For example, a drone may have a laser pointer and/or projector that it may use to illuminate a route to follow and/or a destination to head towards. As another example, a drone may point (e.g., using a machine-controlled extendable arm) in the direction of the evacuation. As another example, a drone may output a message indicating that the drone will lead (e.g., by flashing lights and/or by outputting a "follow me" message via speaker) the evacuation and may move towards an exit. Multiple strategies may be used by one or more different drones.

The drones 160 may continue uploading sensor data to the emergency response computing platform 110 as they attempt to assist the evacuation. The emergency response computing platform 110 may thus determine whether any persons 710 are successfully evacuating or not (e.g., using object recognition techniques to determine the location of the persons 710). The emergency response computing platform 110 may cause one or more drones 160 to stay nearby one or more persons 710 so the persons 710 may continue receiving evacuation assistance from the drones 160. Multiple drones 160 may thus assist in the evacuation of groups of people, who may move in different directions and/or at different speeds, by staying nearby the persons 710 who have not yet evacuated.

Returning to FIG. 2E, at step 218, the emergency response computing platform 110 may receive an indication that first responders are on site. The dispatch computing system 140 may transmit such an indication to the emergency response computing platform 110. A dispatcher may be monitoring the first responders' position using data received from the emergency responder system 150. The data may further indicate a location of the first responders (e.g., east of the premises, outside a particular door, and/or the like).

At step 219, the emergency response computing platform 110 may instruct the drones 160 to assist the first responders. The drones may assist by continuing to assist with evacuation if people are still evacuating, by performing another sweep of the area to find any not-yet-evacuated people, injured people, or other victims, and/or by leading the first responders to the victims and/or other people that are not yet evacuated. Therefore, at step 220, one or more drones 160 may perform another survey of the emergency location to find any victims or other people in need of assistance. The sensor data captured by the drones 160 may be uploaded to the emergency response computing platform 110, which may analyze the data to identify victims or other people (e.g., using object recognition techniques as discussed above).

Figure 2F:
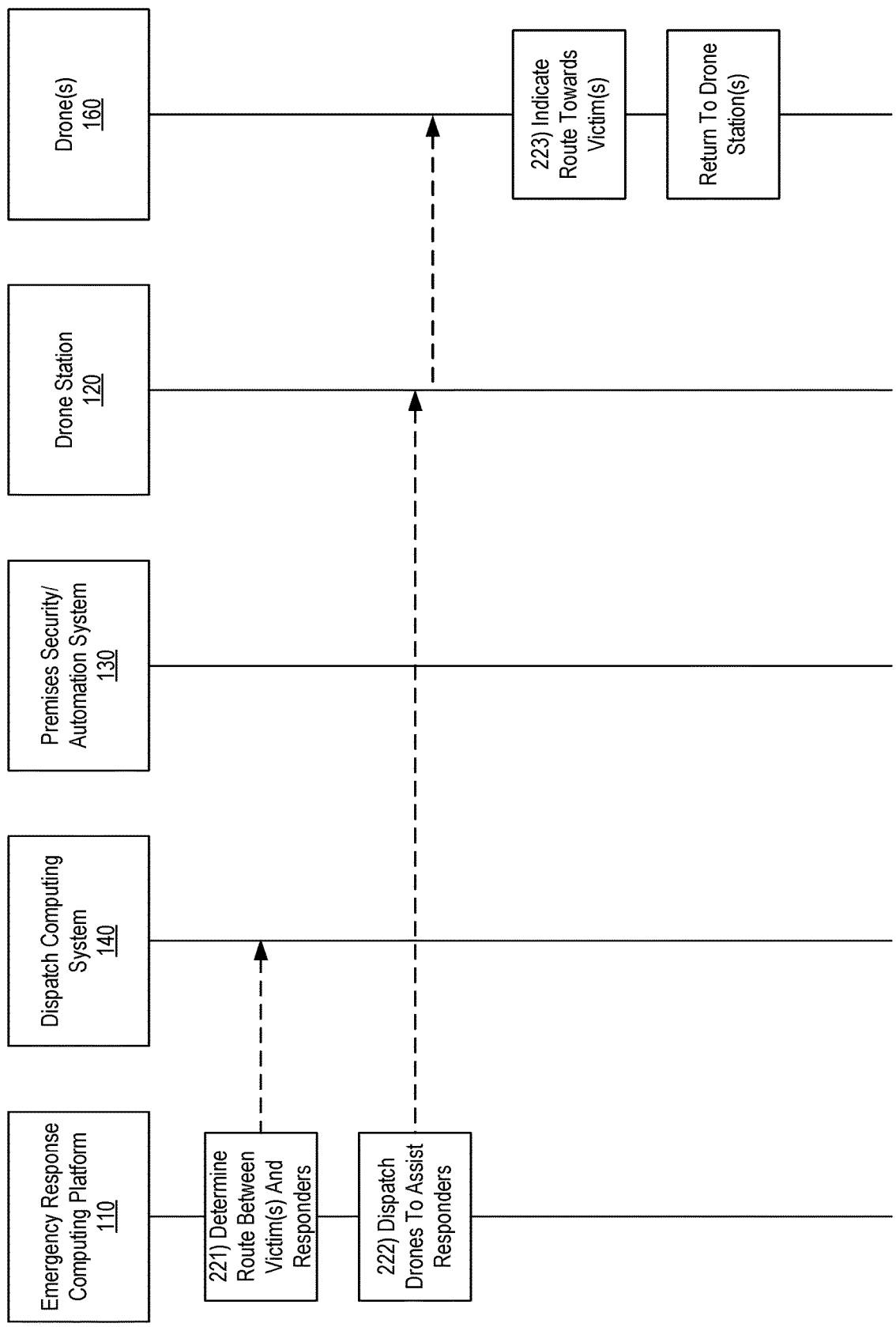

Turning to FIG. 2F, at step 221, the emergency response computing platform 110 may use data indicating the location of the victims and/or data indicating the location of the first responders to determine one or more routes from the first responders to the victims. The emergency response computing platform 110 may transmit the location of the victims and/or the routes to the first responders (e.g., via the dispatch computing system 140). At step 222, the emergency response computing platform 110 may dispatch the drones 160 to assist the first responders in moving towards and locating the victims.

At step 223, the drones 160 may indicate, to the first responders, the routes towards the victims. As before, the drones 160 may use a laser pointer and/or projector to illuminate a route to follow and/or a destination to head towards, may point (e.g., using a machine-controlled extendable arm) in the direction of the victim, and/or may output a message indicating that it will lead (e.g., by flashing lights and/or by outputting a "follow me" message via speaker) and move towards the victim. Multiple strategies may be used by one or more different drones 160 to assist in locating the victims. And as before, the drones 160 may stay near the first responders in order to ensure that the first responders are able to follow the indicated route. The drones may continue in the above fashion until the emergency condition is over, all people are evacuated, and/or until the drones run low on battery power. Then, at step 224, the drones may return to the drone stations 120 to dock and/or recharge.

Figure 8:
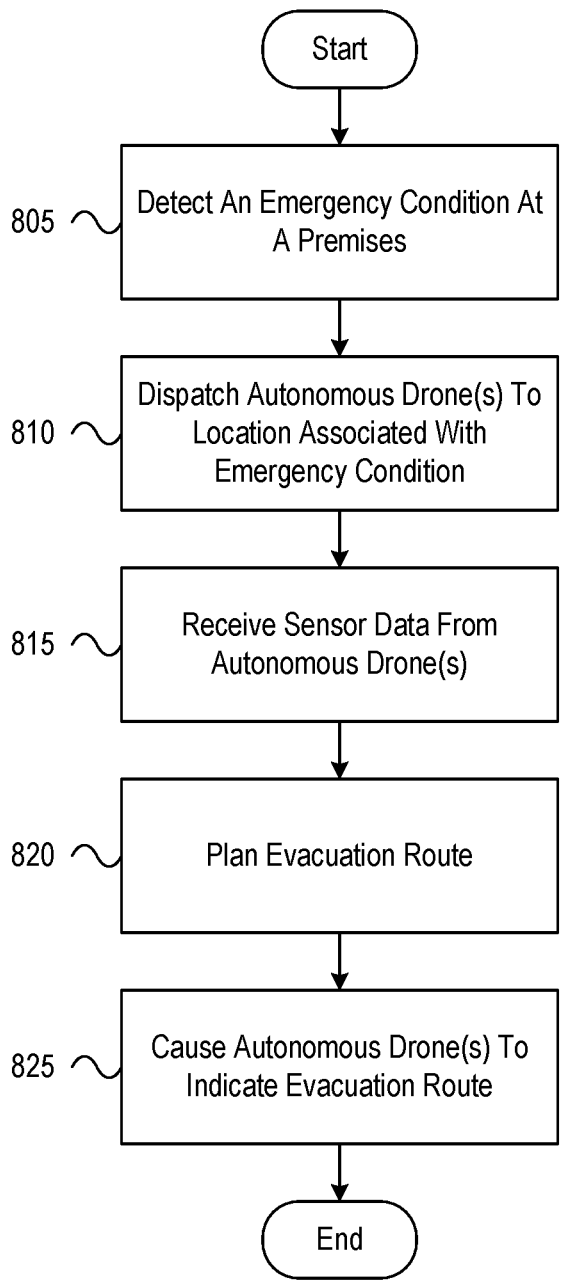
FIG. 8 depicts an illustrative method for detecting and responding to emergency conditions in accordance with one or more example embodiments.

FIG. 8 illustrates an exemplary method for detecting and responding to an emergency condition. At step 805, an emergency response computing platform may detect an emergency condition at a premises. At step 810, the emergency response computing platform may dispatch one or more autonomous drones to a location associated with the emergency condition. At step 815, the emergency response computing platform may receive, from the one or more autonomous drones, sensor data associated with the emergency condition. At step 820, the emergency response computing platform may plan, based on the sensor data, an evacuation route for safely evacuating the premises. At step 825, the emergency response computing platform may transmit an instruction that causes the one or more autonomous drones to indicate, to one or more persons in a vicinity of the emergency condition, the evacuation route.

The systems and methods described herein beneficially allow for an early and automatic detection of an emergency condition based on sensor data that may be captured at a premises. Both before and after an emergency condition is detected, autonomous drones may survey the premises to collect sensor data, which may allow more accurate determination of the severity and extent of the emergency condition. This detailed information about the emergency condition may, in turn, allow a determination of what actions may be taken to mitigate the emergency condition while first responders are on their way, and may allow autonomous drones to assist in providing a safe evacuation if necessary. Finally, having detailed sensor information about an emergency condition may allow first responders, when they arrive, to assist in responding to the emergency condition quickly and effectively.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   detecting, based on received sensor data, an emergency condition at a location;
   generating a response plan containing response actions for responding to the emergency condition where the emergency condition is present;
   generating a user interface indicating the response actions of the response plan, the response actions including dispatch of one or more drones;
   transmitting an instruction that causes a computing device to output the user interface; and
   dispatching the one or more drones to the location upon detecting the emergency condition.

2. The method of claim 1, wherein the user interface includes an indication of the received sensor data.

3. The method of claim 1, further comprising:
   generating a premises map.

4. The method of claim 3, further comprising:
   comparing location data to the premises map; and
   determining a room associated with the emergency condition based on the comparing.

5. The method of claim 1, wherein the user interface includes a map with an indicator of the location.

6. The method of claim 1, wherein the user interface includes a display of at least one of image data or video data obtained in an area adjacent to the location.

7. The method of claim 6, wherein the at least one of the image data or the video data is obtained by the one or more drones.

8. A system comprising:
   a processor;
   a communication interface communicatively coupled to the processor; and
   memory storing computer-readable instructions that, when executed by the processor, cause the processor to:
      detect an emergency condition based on sensor data obtained at a location;
      determine a response plan for responding to the emergency condition;
      generate a user interface indicating one or more response actions of the response plan where the emergency condition is present, the one or more response actions including dispatch of one or more drones;

transmitting, via the communication interface, an instruction that causes a computing device to output the user interface; and dispatching the one or more drones to the location upon detecting the emergency condition in accordance with the response plan.

9. The system of claim 8, wherein the user interface includes an indication of the sensor data.

10. The system of claim 8, wherein the computer-readable instructions, when executed by the processor, further cause the processor to:

generate a premises map based on the sensor data.

11. The system of claim 10, wherein the computer-readable instructions, when executed by the processor, further cause the processor to:

compare location data to the premises map; and
determine a room associated with the emergency condition based on the comparing.

12. The system of claim 8, wherein the user interface includes a map with an indicator of the location.

13. The system of claim 8, wherein the user interface includes a display of at least one of image data or video data obtained in an area adjacent to the location.

14. The system of claim 13, wherein the at least one of the image data or the video data is received from the one or more drones.

15. One or more non-transitory computer-readable media storing instructions that, when executed by a computing platform comprising at least a processor, memory, and a communication interface, cause the computing platform to:

detect an emergency condition at a location using sensor data acquired at the location;

generate a response plan to respond to the emergency condition where the emergency condition is present;

generate a user interface indicating one or more response actions of the response plan, the one or more response actions including dispatch of one or more drones;

transmit, via the communication interface, an instruction that causes a computing device to output the user interface; and dispatch the one or more drones to the location upon detecting the emergency condition.

16. The one or more non-transitory computer-readable media storing instructions of claim 15, wherein the user interface indicates the sensor data.

17. The one or more non-transitory computer-readable media storing instructions of claim 15, that, when executed by the computing platform, further cause the computing platform to:

generate a premises map based on the sensor data.

18. The one or more non-transitory computer-readable media storing instructions of claim 17, that, when executed by the computing platform, further cause the computing platform to:

compare location data to the premises map; and
determine a room associated with the emergency condition based on the comparing.

19. The one or more non-transitory computer-readable media storing instructions of claim 15, wherein the user interface indicates a map with an indicator of the location.

20. The one or more non-transitory computer-readable media storing instructions of claim 15, wherein the user interface includes a display of at least one of image data or video obtained by the one or more drones.

* * * * *